United States Patent [19]

Motoyama

[11] 4,426,690
[45] Jan. 17, 1984

[54] OPTICAL REPRODUCING DEVICE HAVING FOCUS SERVO SYSTEM

[75] Inventor: Tadashi Motoyama, Ebina, Japan

[73] Assignees: Sony Corporation, Tokyo, Japan

[21] Appl. No.: 337,825

[22] Filed: Jan. 7, 1982

[30] Foreign Application Priority Data

Jan. 14, 1981 [JP] Japan .................................. 56-4165

[51] Int. Cl.³ .............................................. G11B 7/00
[52] U.S. Cl. ..................................... 369/45; 250/201
[58] Field of Search ..................... 369/44, 45, 46, 124; 250/201, 202, 210

[56] References Cited

U.S. PATENT DOCUMENTS

| | | | |
|---|---|---|---|
| 3,974,327 | 8/1976 | Van Dijk | 369/45 |
| 3,976,828 | 8/1976 | Janssen | 369/45 |
| 4,128,847 | 12/1978 | Roullet et al. | 369/45 |
| 4,286,147 | 8/1981 | Tsuboi et al. | 369/45 X |
| 4,337,532 | 6/1982 | Oprandi et al. | 369/45 |
| 4,338,682 | 7/1982 | Hosaka et al. | 369/44 |

Primary Examiner—Bernard Konick
Assistant Examiner—Donald McElheny, Jr.
Attorney, Agent, or Firm—Lewis H. Eslinger; Alvin Sinderbrand

[57] ABSTRACT

An optical reproducing device for reproducing information from a rotating record medium includes a focus control system for displacing a focusing lens perpendicular to the plane of the record medium. A light beam is conducted through the focusing lens on to the record medium. A capture range search system is provided to move the focusing lens at a substantially constant speed from a rest position until it is positioned within the capture range of the focusing control system. The capture range search system includes a bridge circuit for sensing the moving speed of the focusing lens. The bridge circuit includes a moving coil of a drive motor for said focusing lens and a variable impedance element. The bridge circuit is balanced by controlling the variable impedance element when the lens is at the rest position.

14 Claims, 8 Drawing Figures

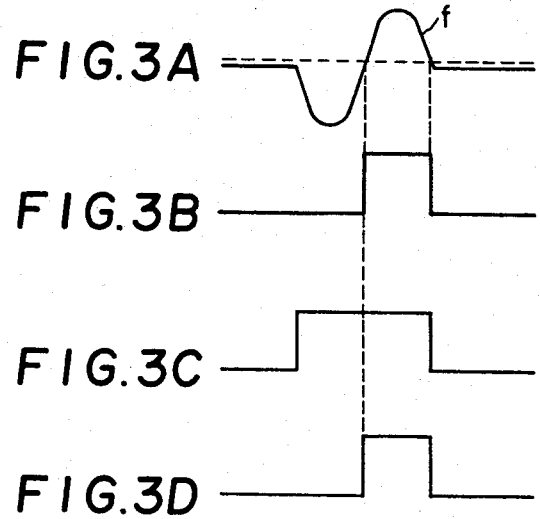
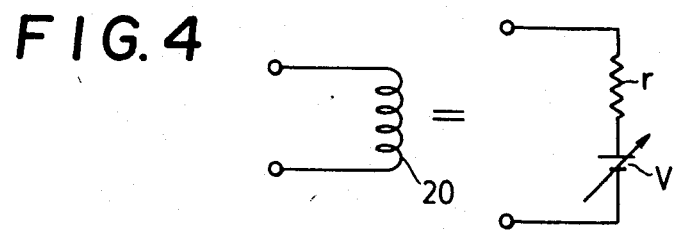

OPTICAL REPRODUCING DEVICE HAVING FOCUS SERVO SYSTEM

BACKGROUND OF THE INVENTION

1. Field of the Invention

This invention relates to an optical reproducing device and more particularly, is suitable for use in a optical disc player wherein a laser beam is used to read information, such as audio or video signals, recorded on a track of a disc in the form of pits.

2. Description of the Prior Art

In an optical reproducing device such as an audio or video disc player, a light beam is used to read an information signal carried by a rotating record carrier in which pits are formed on a track of the record carrier.

To ensure that the reading light beam is always directed on a track during the reading of the carrier, the focusing spot of the beam must be adjustable in an axial direction so that it can follow the track. It is to be appreciated that in general, the moving carrier is not perfectly flat.

The focusing point of the laser spot along the optical axis of the beam may be adjusted in several ways. One way is to move the reading lens or focusing lens along its axis by an electromagnetic motor moving perpendicularly to the plane of the carrier.

The electromagnetic motor can be controlled by a focusing control system which includes a detecting means for detecting the focusing deviation or error of the reading beam. The detecting means, in general, detects the focusing error on the basis of reproduced signals from the track. Since the dynamic ratio of the detecting means is usually very low, the focusing control system has a very narrow capture range, for example, about ±10 μm. Outside this range it is impossible to detect a focus error, yet the focus control system is not properly locked.

At the beginning of a reproduction operation, therefore, it is necessary initially to bring the laser spot close to the focussed position so that the control system remains stable during subsequent operation.

Lens movement can also be performed by another control system which always moves the lens in the same direction from a rest position until it is positioned within the capture range or pickup zone of the focusing control system. The control system or capture range search system has a speed control loop for moving the lens at a constant speed, because, if the speed is too high, the system will overshoot the pickup zone.

The speed control loop includes a speed sensor for detecting the speed of the lens driven by the electromagnetic motor. When the motor has a moving-coil arrangement, such as a dynamic loudspeaker, a counter electromotive voltage induced across the moving-coil may be representative of the moving speed of the lens. It is, however, difficult to represent the moving speed accurately, as the moving-coil has resistances which are affected by temperature variations. Such a conventional system, therefore, has disadvantages since the moving speed can not be maintained constant, resulting in misoperation of the capture range search system. Also, when the speed is too high, the system may pass beyond the capture range. When the speed is too low, the system can take too much time to reach the capture range.

OBJECTS AND SUMMARY OF THE INVENTION

An optical reproducing device according to the present invention comprises an accurate approaching speed sensing means which overcomes the aforementioned difficulties of the prior art.

In particular, an improved compensation means for compensating for temperature variations is coupled to the speed sensing means and detects accurately the moving speed of the focusing lens. The system according to the present invention permits the focusing lens to move at an optimum, constant speed to the operating range of the focus control system where it can be locked into stable operation.

According to the present invention, an optical reproducing device for reproducing information from a rotating record medium with a light beam directed thereon comprises a light source such as a laser for emitting the beam through a focusing lens on to the record medium, a focus control system comprising an electromagnetic motor having a moving coil for displacing the focusing lens perpendicular to the plane of the record medium, and a capture range search system for driving the motor to move the focusing lens at a substantially constant speed from a rest position until it is positioned within the capture range of the focusing control system. The capture range search system includes a bridge circuit for sensing the moving speed of the focusing lens. The bridge circuit includes the moving coil and a variable impedance element which form two of the four sides of the bridge. The bridge circuit also includes a control circuit for controlling the variable impedance element to balance the bridge circuit when the lens is at the rest position, and a drive circuit for supplying a drive current to the moving coil of the motor in response to the output of the bridge circuit so that the output of the bridge circuit becomes nearly constant in a balanced state.

The above, and other objects, features and advantages of the invention will be apparent from the following detailed description of an illustrative embodiment thereof, which is to be read in connection with the accompanying drawings.

BRIEF DESCRIPTION OF THE DRAWINGS

FIGS. 3A-3D are waveform diagrams of various signals in the circuit of FIG. 2;

FIG. 4 is an equivalent D.C. circuit diagram of a coil of a linear drive motor when the motor is ON during a search for a focus point.

DESCRIPTION OF THE PREFERRED EMBODIMENT

Figure 1:
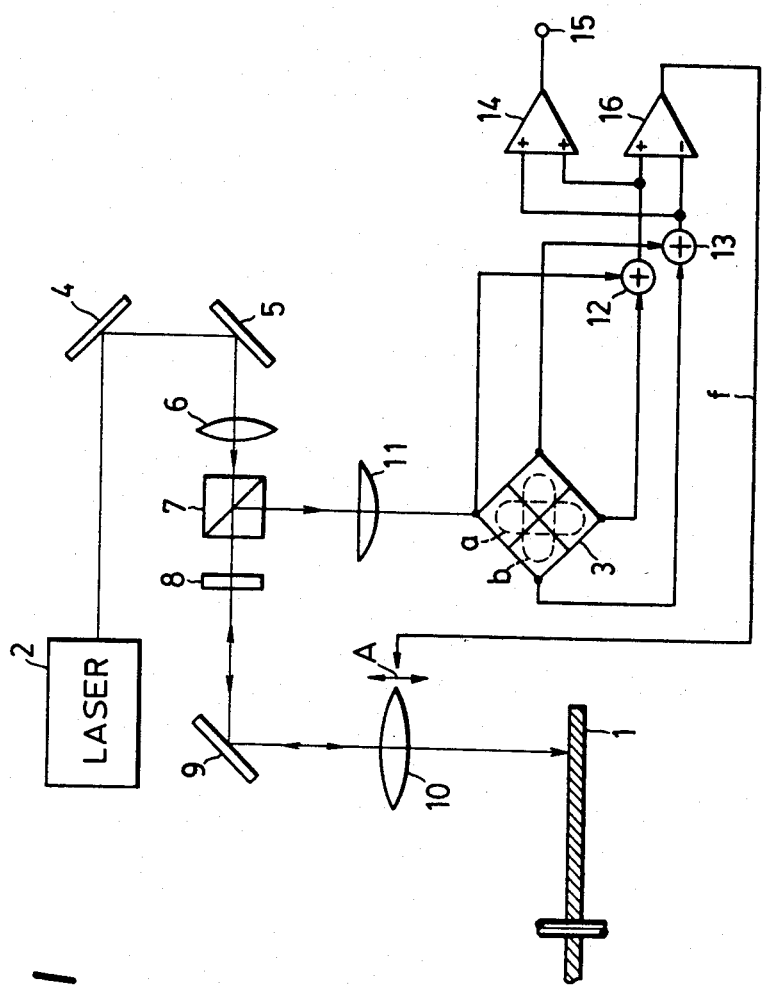
FIG. 1 is a block diagram of an optical system and a focus control system for a disc player in combination with an embodiment of the present invention.

FIG. 1 is a block diagram of an optical system and a tracking control system in a disc player used with an embodiment of the present invention. On a disc 1 information is recorded sequentially as concave or convex optical structures such pits along a volute-shaped track. Reproduced information signals are derived from a beam from a laser 2 positioned in a pickup reflected through an optical system onto a pit formed in the track on the disc 1. The reflected light beam is modulated by the pit and directed onto a photo diode array 3 to generate a signal.

The optical system comprises mirrors 4, 5, a magnifying lens 6, a polarized beam splitter 7, a 2/4 wavelength plate 8, a tracking galvanomirror 9, a focusing lens 10 and a cylindrical lens 11. A light beam from the laser 2 is reflected by the mirrors 4 and 5 upon the magnifying lens 6 whereby the beam is magnified so as to cover the aperture of the focusing lens 10. The light beam then passes through the polarized beam splitter 7 and is converted into a circularly polarized beam by the 2/4 wavelength plate. Tracking galvanomirror 9 then directs the light beam in a direction incident upon disc 1. Focusing lens 10 focuses the light beam in a fine spot on the surface of the disc 1.

The beam is modulated by a pit on the disc and is reflected, whereby the rotational direction of the circularly polarized beam is reversed. The beam thus modulated and reflected is picked up by the focusing lens 10. The reflected light beam follows the above-described optical path in reverse and is again converted to a linearly polarized beam by the 2/4 wavelength plate 8. The beam is next reflected by the polarized beam splitter 7, and then passes through the cylindrical lens 11 and strikes the photo diode array 3.

The photo diode array 3 comprise four divided elements. The outputs of two pairs of opposed photo diodes are added by adders 12 and 13, respectively, and the outputs of the adders 12 and 13 are added by an adder 14, whereby a reproduced RF signal is obtained. The reproduced RF signal is transmitted from a terminal 15 to a demodulation circuit (not shown).

The width of the track formed on the disc 1 is, in one embodiment 1.6 μm, so the diameter of a spot formed on the disc 1 is about 1.6 μm. The focusing lens 10, therefore, must generally have a large NA (Numerical Aperture). However, the depth of focus of such a lens is so shallow that surface vibration of about +10 μm of the disc 1 cause defocusing, thus causing the diameter of the spot to become larger. A number of tracks, several multiples of ten, may be irradiated with the light beam, making reproduction impossible.

To eliminate such difficulties, the focusing lens 10 is connected to a moving coil type moving mechanism such as a linear drive motor whereby a focus error caused by surface vibrations of the disc 1 are detected and, on the basis of the detected error signal, the position of the focusing lens 10 is controlled in a direction orthogonal to the surface of the disc 1. The focus error can be computed by a subtractor 16 as the difference between the signals obtained by adding the outputs of the two pairs of opposed sides of the photo diode array 3 i.e., by the signals from the adders 12 and 13, respectively.

When the focus of the focusing lens 10 is above or below the surface of the disc 1, the image of the reflected beam formed on the photo diode array 3 by the cylindrical lens 11 becomes an ellipse, as indicated by the dotted lines "a" and "b" in FIG. 1, so that subtractor 16 supplies a positive or negative focus error signal. The focus error signal is supplied to a driving coil (not shown) for the focusing lens 10 whereby the lens 10 is moved in the direction indicated by arrow A to form a focused spot on the disc surface. When a focused spot is formed on the track of the disc 1, a circular image is formed on the photo diode array 3 and a focus error signal f is zero. Two methods of detecting a focus error have been proposed. In one method, a wedge in place of the cylindrical lens 11 and, in a second method, an auxiliary beam is used.

The focus control system described above has a very narrow capture range, about ±10 μm, and outside this range it is impossible to detect a focus error and the focus control system can not be locked. At the beginning of disc reproduction, therefore, the focusing lens 10 gradually approaches the disc 1 from a position away from the disc until it is positioned within the capture range of the focus control system, and after such a focus scan or focus search, that is, after the focusing lens 10 has entered the capture range of the disc 1, the focus servo control mode is actuated.

Figure 2:
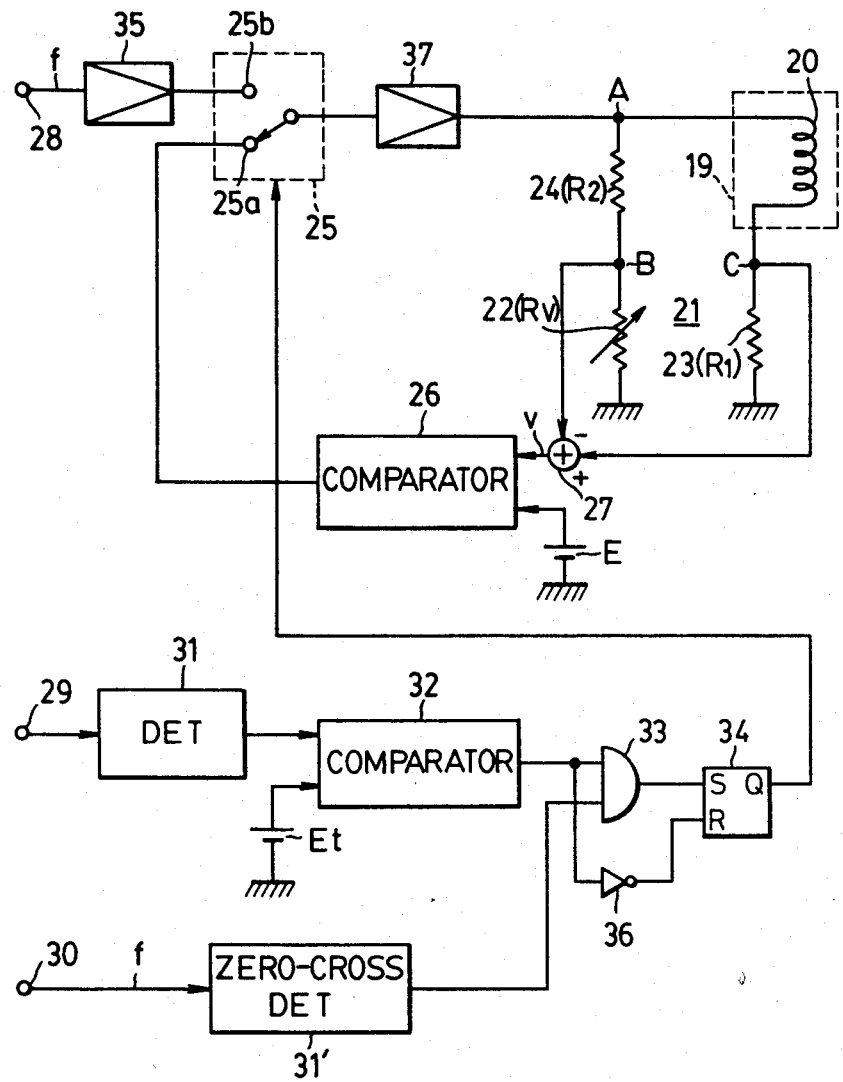
FIG. 2 is a block circuit diagram of a prior art focus search control system.

FIG. 2 is a block diagram of a prior art control circuit for performing a focus search, and FIG. 3 is a set of waveform diagrams useful in explaining the operation of the control circuit of FIG. 2.

In FIG. 2, a coil 20 of a linear drive motor 19 connected to the focusing lens 10 is connected to one side of a bridge circuit 21, and a variable resistor 22 for balancing the bridge circuit is connected to the opposite side. The other pair of opposite sides of the bridge circuit 21 comprise resistors 23 and 24. In the focus search mode of operation, a change-over switch 25 is connected to a contact 25a to supply a driving current for the coil 20 through an output terminal of an amplifier 37 according to the output of a comparator 26, thus initiating movement of the focusing lens 10.

As the coil 20 moves, a counter electromotive voltage V is induced thereacross. FIG. 4 illustrates an equivalent D.C. circuit in this state. The circuit of FIG. 4 comprises a DC resistor "r" and an electromotive voltage V proportional to the moving speed. If the voltages at points A, B and C of the bridge circuit 21 are assumed to be $V_A$, $V_B$ and $V_C$, respectively, and the resistance values of the variable resistor 23 and of the resistors 23 and 24 are assumed to be $R_v$, $R_1$ and $R_2$, respectively, $$V_B = \frac{R_v}{R_2 + R_v} V_A \tag{1}$$

$$V_C = \frac{V_A - V}{r + R_1} R_1 \tag{2}$$

When the bridge is balanced, $$\frac{R_v}{R_2 + R_v} = \frac{R_1}{R_1 + r} \tag{3}$$

Thus, $$V_B - V_C = \frac{R_1}{r + R_1} V = v \tag{4}$$

That is, if the voltages at the points B and C of the bridge circuit 21 are subtracted from each other by a subtractor 27, it is possible to derive a voltage "v" proportional to the counter electromotive voltage V (the moving speed of the coil). The voltage "v" is compared with a reference voltage E in the comparator 26, and an electric current proportional to the compared output flows in the coil 20 through the amplifier 37.

The control loop of FIG. 2 operates so that v=E, whereby the counter electromotive voltage is constant, that is, the moving speed of the coil 20 becomes constant.

In this state of constant speed control, the focus error signal f output from the subtractor 16 in FIG. 1 is fed through a terminal 30 to a zero-crossing detector 31', as shown in FIG. 2. As shown in FIG. 3A, the focus error signal is obtained as a positive or negative signal in the capture range of the focus control system and reverses in polarity before and after the focus point (focus coincident point). Consequently, from an output terminal of the zero-crossing detector 31' there is obtained a pulse representing the focus coincident point, as shown in FIG. 3B.

On the other hand, the reproduced RF signal obtained from the terminal 15 in FIG. 1 is fed through a terminal 29 to an envelope detector 31 in FIG. 2, then is transmitted to a comparator 32. The reproduced RF level of the focus error signal f also increases rapidly. Above a predetermined threshold level $E_t$ detected RF level signal from the output terminal of the comparator 32 is derived. This detected RF signal and the foregoing detected zero-crossing signal are transmitted to an AND gate 33 and a flip flop 34 which is set by a detected signal which is output from the AND gate 33. As a result, the switch 25 is moved to a contact 25b and the focus error signal f is fed to a terminal 28, as shown in FIG. 2. The signal f is supplied to the coil 20 through an amplifier 35, the switch 25 and the amplifier 37 to lock the focus control. On the other hand, when the reproduced RF signal drops to zero, the output of the comparator 32 drops to a low level, and the flip flop 34 is reset by a pulse from an inverter 36 and the switch 25 is again moved to the contact 25a whereby the focus search mode is resumed.

The focus search mode operates correctly only when the bridge circuit 21 is balanced. If the bridge circuit 21 is unbalanced, a counter electromotive force is not correctly detected, and the term $V_A$ enters equation (4), and the moving speed becomes too high or, alternatively, becomes zero, and the focus control cannot be engaged. The bridge circuit 21 is usually balanced by adjusting the variable resistor 22 at the time of manufacture, but the balance can be easily lost due to variations with time, temperature change, etc. Since the coil 20 is made of a copper wire, its temperature characteristics are poor and its specific resistance value "r" changes largely due to its self-heat-generating characteristics and changes in ambient temperature.

In order to eliminate such difficulties, a thermistor or the like has heretofore been inserted in the bridge circuit 21, but even so, it is very difficult to maintain the balance in the bridge circuit 21.

In accord with the present invention, the bridge circuit is kept balanced automatically without adjustment and the focus coincident point can be detected with certainty.

Figure 5:
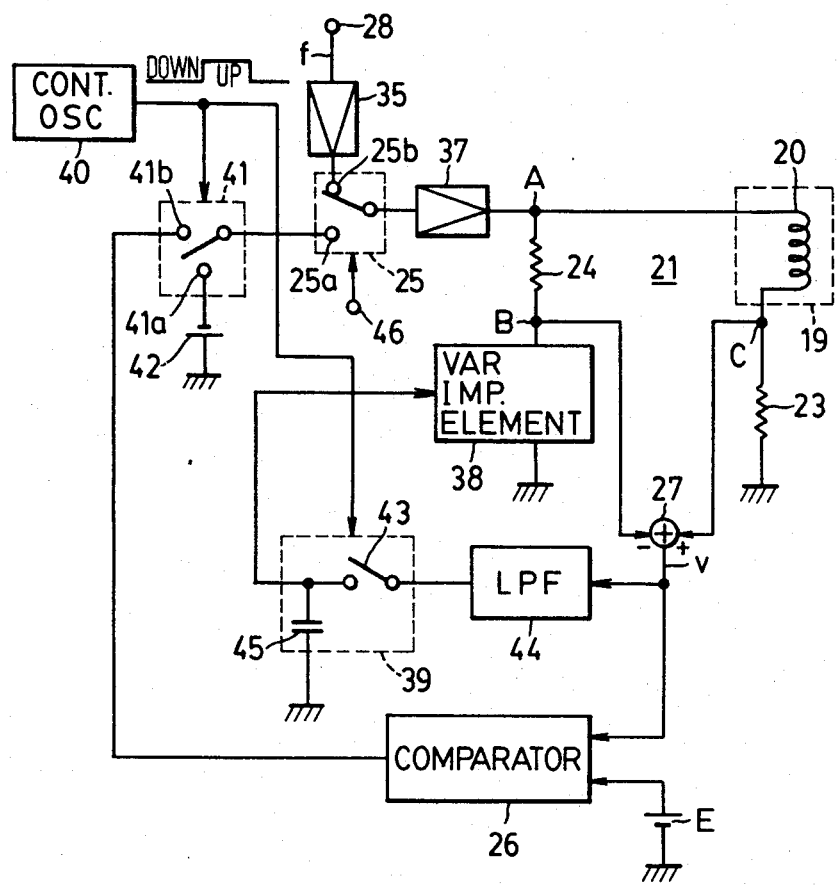
FIG. 5 is a block circuit diagram of a focus search control system in accord with the present invention.

FIG. 5 is a block diagram of a focus search circuit in accord with the present invention. In this embodiment, the variable resistor 22 of the bridge circuit 21 shown in FIG. 2 is replaced by a variable impedance element 38 comprising one or more FET transistors or the like. The variable impedance element 38 is controlled, as will be described more fully below, by the output of a sample holding circuit 39. In the focus search mode, the focusing lens 10 is scanned one time at a constant speed in a direction approaching the disc 1 by a controlled oscillator 40. If the focus control system is not locked due to the presence of a flaw or the like on the disc 1, the focusing lens 10 is reset to the farthest position from the disc 1 and is again scanned in a direction approaching the disc. A control signal which has high and low levels at a period of about 5 seconds is supplied by the controlled oscillator 40 to a change-over switch 41 and the sample holding circuit 39. When this control signal is at a high level, the focusing lens 10 is moved in an upward direction, in a direction approaching the disc, while at a low level indicated in FIG. 5 as DOWN of that signal the focusing lens 10 is reset to the farthest position from the disc 1.

When the output of the controlled oscillator 40 is at a low level, the switch 41 is connected to a contact 41a and a negative bias voltage is supplied from a negative power source 42 to the coil 20 of the linear drive motor 19 through the switches 41, 25 and the amplifier 37, whereby the focusing lens 10 is stopped in the lowest position. At this time, moreover, with a low-level output of the controlled oscillator 40, a switch 43 in the sample holding circuit 39 is closed and, in the same manner as in FIG. 2, a detected moving speed voltage "v" obtained by taking the difference between the voltages at the points B and C of the bridge circuit 21 by the subtractor 27 is supplied through a low-pass filter 44 to a holding capacitor 45 in the sample holding circuit 39.

The output of the sample holding circuit 39 controls the variable impedance element 38 to balance the bridge circuit 21. The input impedance of the variable impedance element 38 is, in a preferred embodiment, very large. The control loop comprising the subtractor 27, the low-pass filter 44, the sample holding circuit 39 and the variable impedance element 38, becomes stable when the detected moving speed voltage "v" is zero, wherein the bridge circuit 21 is balanced. Since the focusing lens 10 is stationary in the lowest position, no counter electromotive voltage V is induced, and the detected moving speed voltage becomes zero if the bridge circuit is balanced. If there is any detected speed voltage "v", it is accumulated in the capacitor 45 and the terminal voltage of the capacitor increases, so the impedance of the variable impedance element 38 decreases, whereby the voltage difference between the points B and C of the bridge circuit becomes small and the detected speed voltage "v" decreases. If the voltage "v" becomes zero, the output of the capacitor 45 in the sample holding circuit 39 does not increase, the loop is stable, resulting in $V_B = V_C$, and the bridge is balanced.

In a balanced state of the bridge, if the output of the controlled oscillator 40 becomes high, the switch 41 moves to contact 41b, the switch 43 in the sample holding circuit 39 turns off, and the focus search loop is formed. Accordingly, the difference in voltage between the points B and C of the bridge circuit 21 is computed by the subtractor 27 and the detected speed voltage "v" supplied by the subtractor 27 is compared with the reference voltage E (the desired value) by the comparator 26. An error voltage is supplied by the comparator 26 to the coil 20 through the switches 41, 25 and the amplifier 37. The control loop allows current to flow in the coil 20 so that v=E, whereby the focusing lens 10 connected to the coil 20 is raised toward the disc 1 at a constant speed, as v is constant.

Once the focus coincident point is detected by the focus search, the flip flop 34 of the coincidence detection circuit of FIG. 2 is set and its high output is supplied to the switch 25 from a terminal 46, as shown in FIG. 5, whereby the switch 25 moves to the contact 25b. The focus error signal f output from the subtractor 16 is supplied from the terminal 28 to the contact 25b, as shown in FIG. 1. The signal f is supplied to the coil 20 through the amplifier 35, the switch 25 and the amplifier 37, thus allowing the focus control operation to take place.

In the present invention, as set forth hereinbefore, the variable impedance element 38 is connected to one side of the bridge circuit 21 for detecting the moving speed of the linear drive motor coil which drives the focusing lens 10, and is controlled so that the bridge circuit 21 is automatically balanced when the focusing lens is stationary, so that even when the bridge is unbalanced due, for example, in ambient, temperature or variation with time, the unbalanced bridge can be automatically restored without adjustment, and variations in the manufacture of the coil 20 can also be accommodated. As a result, it is possible to have the output of the bridge circuit 21 represent the coil moving speed without an error, and on the basis of the detected moving speed voltage the coil 20 can be moved at an optimum, constant speed, thereby permitting the foscusing lens 10 to move to the operating range of the focus control system and be locked into stable operation.

Although a specific embodiment of the present invention has been described in detail herein with reference to the accompanying drawings, it is to be understood that the invention is not limited to that precise embodiment, and that various changes and modifications may be effected therein by one skilled in the art without departing from the spirit and scope of the invention as defined in the appended claims.

What is claimed is:

1. An optical reproducing device for reproducing information from a rotating record medium with a light beam directed thereon, comprising:
   a light source for emitting said beam through a focusing lens on to said record medium;
   a focus control system comprising an electromagnetic motor having a moving coil for displacing said focusing lens perpendicular to the plane of said record medium;
   a capture range search system for driving said motor to move said focusing lens at a substantially constant speed from a rest position until it is positioned within the capture range of said focus control system, said capture range search system comprising:
   a bridge circuit with four sides for sensing the moving speed of said focusing lens, said bridge circuit including said moving coil and a variable impedance element in two respective sides of said four sides of said bridge circuit;
   a control circuit for controlling said variable impedance element to balance said bridge circuit when said focusing lens is at said rest position; and
   a drive circuit for supplying a drive current to said moving coil of said motor in response to an output of said bridge circuit so that said output of said bridge circuit becomes substantially constant in a balanced state of said bridge circuit.

2. An optical reproducing device as in claim 1, wherein said two sides of said bridge circuit in which said moving coil and said variable impedance element are connected opposite to each other; and wherein the other pair of opposed sides of said bridge circuit comprise resistors.

3. An optical reproducing device as in claim 1, wherein said control circuit for controlling said variable impedance element comprises a subtractor for detecting the difference voltage between the voltages at a pair of terminals of said bridge circuit, said difference voltage being proportional to a counter electromotive voltage induced across said moving coil, and a sample holding circuit for sampling and holding the output of said subtractor, said variable impedance circuit being controlled by the output of said sample holding circuit.

4. An optical reproducing device as in claim 3, wherein said sample holding circuit comprises a sample gate switch to which said output of said subtractor is supplied, and an accumulating means connected to said output of said sample holding switch, said sample holding switch being closed when said focusing lens is biased to said rest position.

5. An optical reproducing device as in claim 4, wherein said accumulating means comprises a holding capacitor.

6. An optical reproducing device as in claim 3, wherein said control circuit further comprises a low-pass filter inserted between said output of said subtractor and the input of said sample holding circuit.

7. An optical reproducing device as in claim 1, wherein said capture range search system further comprises a control oscillator for generating a periodic pulse signal having low and high levels and a first switch for changing the operation mode of said moving coil to either a rest mode or an approaching mode, said first switch having first and second stationary contacts and a movable contact, said movable contact being connected to said first contact when said pulse signal is at said low level in said rest mode so that a negative bias voltage is fed to said moving coil for positioning said focusing lens at said rest position far from said record medium, and said movable contact being connected to said second contact when said pulse signal is at said high level in said approaching mode so that said output of said drive circuit is supplied to said moving coil for moving said focusing lens in response to said output of said bridge circuit to approach said capture range of said focusing control system.

8. An optical reproducing device as in claim 7, wherein said sample gate switch is closed when said pulse signal at said output of said control oscillator is at said low level and said focusing lens is at said rest position.

9. An optical reproducing device as in claim 7, wherein said drive circuit comprises a comparator which compares said output voltage of said subtractor with a reference voltage and produces an error signal to be supplied to said moving coil, whereby said moving coil is driven so that said output voltage of said subtractor is substantially equal to said reference voltage, resulting in a substantially constant speed for movement of said focusing lens.

10. An optical reproducing device as in claim 7, further comprising a second switch for changing said operation mode of said moving coil from said approaching mode to a focus control mode under control of said focus control system, a focus error detecting circuit and a capture range detecting circuit, said second switch having first and second stationary contacts and a movable contact, said movable contact being connected to said first stationary contact to which said output of said first switch is supplied, for operating said moving coil under the control of said capture range search system when said capture range detecting circuit does not detect said range, and said movable contact being connected to said second stationary contact to which said output of said focus error detecting circuit is supplied, for operating said moving coil under the control of said focus control system when said capture range detecting circuit detects said range.

11. An optical reproducing device as in claim 10, wherein said focus error detecting circuit comprises a photoelectric transducer for translating the return beam from said record medium to an electrical signal and a circuit for extracting the focus error signal from said electrical signal.

12. An optical reproducing device as in claim 10, wherein said capture range detecting circuit comprises a zero-crossing detector which detects a zero-cross point in said output of said focus error detecting circuit and a flip-flop circuit which receives the output of said zero-crossing detector and produces a control signal for said second switch.

13. An optical reproducing device as in claim 12, wherein said capture range detecting circuit further comprises a detector for detecting the envelope of said output of said photo-electric transducer and a comparator for comparing the output of said detector with a reference voltage to produce a signal representing an information reproducing condition of said optical reproducing device, said signal being fed through an inverter to a reset input of said flip-flop circuit.

14. An optical reproducing device as in claim 13, wherein said capture range detecting circuit further comprises an AND circuit, said outputs of said comparator and said zero-crossing detector being supplied to the inputs of said AND circuit to produce an output to be supplied to a set input of said flip-flop circuit.

* * * * *